United States Patent
Bloch et al.

(10) Patent No.: US 6,249,258 B1
(45) Date of Patent: Jun. 19, 2001

(54) TRANSPONDER ARRANGEMENT

(75) Inventors: Werner Bloch, Eislingen; Lothar-Markus Leuck, Frankfurt am Main; Thomas Reitmayer, Ulm; Michael Müller, Öpfingen, all of (DE)

(73) Assignee: AEG Identifikationssysteme (DE)

( * ) Notice: Subject to any disclaimer, the term of this patent is extended or adjusted under 35 U.S.C. 154(b) by 0 days.

(21) Appl. No.: 09/043,312

(22) PCT Filed: Sep. 11, 1996

(86) PCT No.: PCT/EP96/03980
  § 371 Date: Sep. 8, 1998
  § 102(e) Date: Sep. 8, 1998

(87) PCT Pub. No.: WO97/10520
  PCT Pub. Date: Mar. 20, 1997

(30) Foreign Application Priority Data

Sep. 15, 1995 (DE) ................................. 195 34 229

(51) Int. Cl.⁷ ...................................................... H01Q 7/08
(52) U.S. Cl. ........................... 343/788; 343/742; 343/787; 343/867
(58) Field of Search .............................. 343/700 MS, 741, 343/742, 866, 867, 788, 787; H01Q 7/08, 1/00

(56) References Cited

U.S. PATENT DOCUMENTS

| 2,740,113 | * | 3/1956 | Hemphill ............................. 343/788 |
| 2,740,114 | * | 3/1956 | Adams ................................. 343/788 |
| 2,824,306 | * | 2/1958 | Pfaff ..................................... 343/788 |
| 4,101,899 | * | 7/1978 | Jones et al. .......................... 343/788 |
| 4,495,503 | * | 1/1985 | Morman .............................. 343/746 |
| 4,839,659 | * | 6/1989 | Stern et al. ................... 343/700 MS |
| 5,625,366 | * | 4/1997 | D'Hont ............................... 343/718 |
| 5,638,080 | * | 6/1997 | Orthmann et al. .................. 343/788 |

FOREIGN PATENT DOCUMENTS

| 655 205 | 3/1986 | (CH) . |
| 31 01 636 A1 | 8/1982 | (DE) . |
| 40 39 690 A1 | 7/1991 | (DE) . |
| 42 20 194 A1 | 12/1993 | (DE) . |
| 43 10 610 A1 | 10/1994 | (DE) . |
| 44 10 732 A1 | 10/1995 | (DE) . |
| 0 285 188 | 10/1988 | (EP) . |
| 0 549 832 A1 | 7/1993 | (EP) . |
| 719526 | 12/1954 | (GB) . |
| 2 024 522 | 1/1980 | (GB) . |
| 59-152703 | 8/1984 | (JP) . |
| WO 91/04503 | 4/1991 | (WO) . |

* cited by examiner

Primary Examiner—Tho Phan
(74) Attorney, Agent, or Firm—McGlew and Tuttle, P.C.

(57) ABSTRACT

The invention concerns a transponder arrangement in which the transponder is disposed on a conductive surface. According to the invention, the coils forming the transponder antenna are aligned at a slight distance from the metal surface with their main magnetic field direction parallel to this surface.

19 Claims, 3 Drawing Sheets

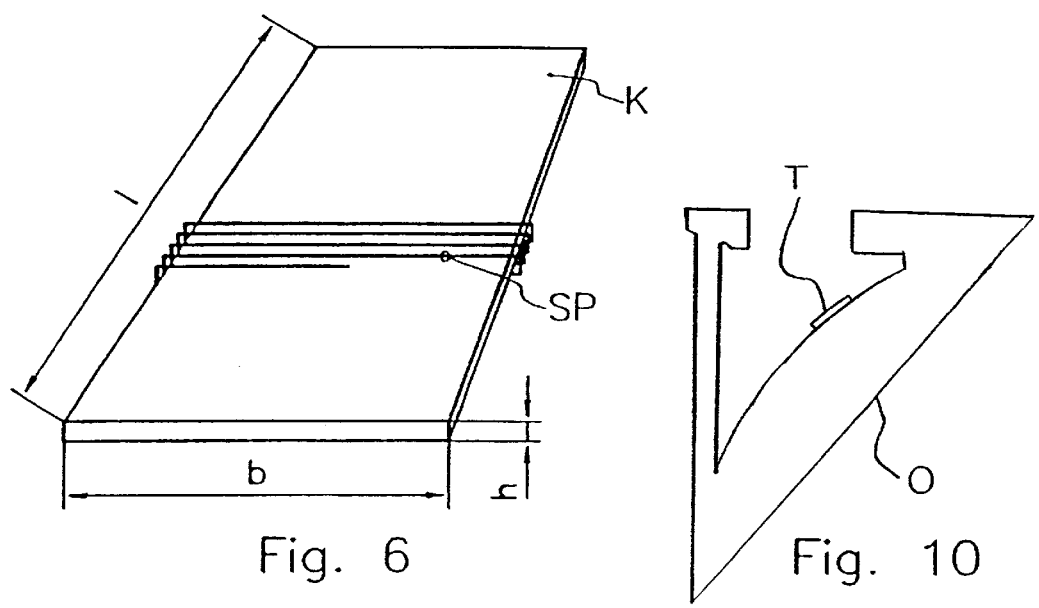
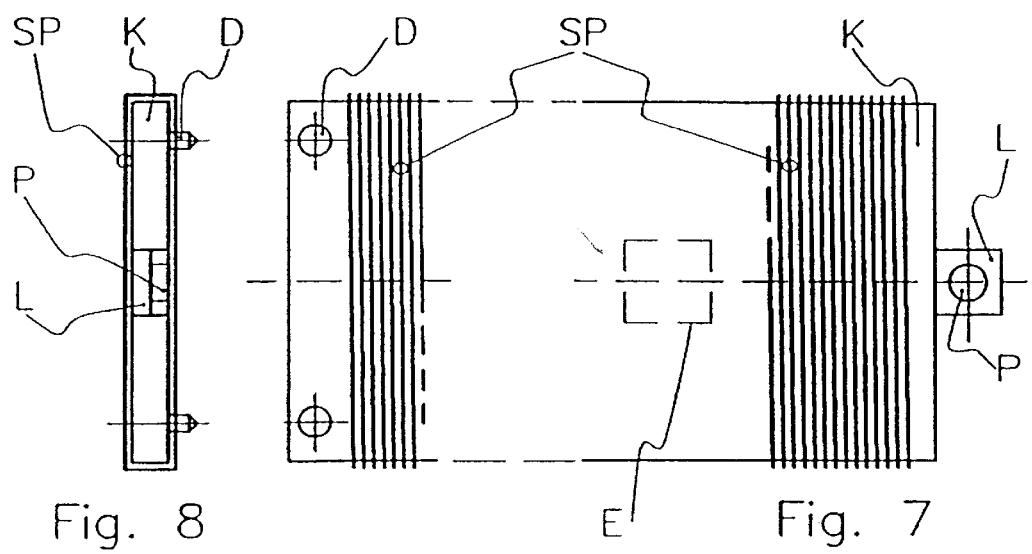
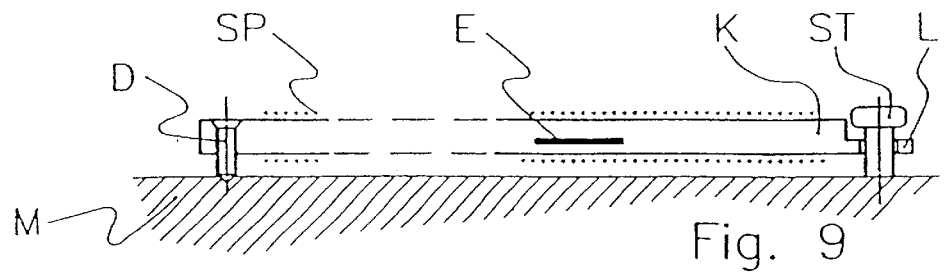

TRANSPONDER ARRANGEMENT

FIELD OF THE INVENTION

The present invention pertains to a transponder array with a transponder arranged on a conductive surface.

BACKGROUND OF THE INVENTION

Transponders, which are able to exchange data with a polling device via alternating electromagnetic fields, are suitable for the contactless polling of information stored on a movable data storage medium. The coupling with the electromagnetic fields is performed, at least on the transponder side, preferably via magnetic dipole antennas, especially air core coils or ferrite antennas.

For example, a device for the recognition of objects, especially motor vehicles, in which flat antennas of a polling station are recessed into the ground with their antenna surfaces in parallel to the road surface, has been known from DE 40 39 690 A1. As for the polling device, the transmitting antenna is designed as a rotating spaced loop, and the receiving antenna as a simple frame. The orientation of transponder antennas arranged on the underbodies of motor vehicles is adjusted to the orientation of the polling antennas or to the strength distribution of their field such that on the transponder side, the coils wound as flat coils on a rectangular parallelepiped have horizontal or vertical antenna surfaces standing vertically one on top of another.

An antenna system for arrangement in the outer surface of an airplane, especially as a direction-finding antenna, is described in GB A 719526. In a first embodiment, a winding is wound on a rod made of a material of high permeability and the rod is inserted into a slot of the outer surface of the airplane. According to another embodiment, rods made of a material of high permeability are inserted in depressions of the metallic surface of the airplane and they face with one end a coil array inserted into a window of the metallic surface. Another direction-finding antenna for airplanes, in which a direction-finding antenna consisting of two crossed air core coils is arranged in the metallic surface of an airplane behind a window covered by a dielectric plate, has been known from GB A 2024522. These prior-art arrays for direction-finding antennas for airplanes require that the metallic surface of the airplane be interrupted at the site of the antenna. In addition, there are restrictions concerning the nature of the material of the metallic surface, which shall not be magnetic.

Besides applications with transponders located in an extensively undisturbed environment, e.g., with transponders carried by persons, transponder arrays on electrically conductive, especially metallic surfaces with nonuniform orientation of the transponders and objects with respect to a polling device are of considerable significance, especially in automatization engineering for the identification of objects.

SUMMARY AND OBJECTS OF THE INVENTION

The basic object of the present invention is to provide advantageous transponder arrays with a transponder antenna arranged on an electrically conductive surface as well as advantageous embodiments of transponders for this.

A transponder array according to the present invention includes a support body formed as a flat body with a small height compared with transverse dimensions of the support body. A coil is wound on the support body with a plurality of coil turns. The coil turns cover a portion of a surface of the support body and are wound around the support body to form a longitudinal axis of the coil oriented substantially in parallel to a plane of the flat body. The coil forms a transponder antenna arranged on an electrically conductive surface with the antenna coil generating a magnetic field having a principal direction forming an angle of less than 45° with the conductive surface and preferably less than 15 degrees.

The principal direction of the magnetic field (director) of the coils is determined in the known manner by the surface normal of the coil surface in the case of flat coils and by the longitudinal axis of the coil in the case of elongated coils.

It is seen that good field coupling and consequently a reliable data exchange are guaranteed with the transponder arrays according to the present invention with an extensive freedom in terms of the arrangement and the orientation of the antennas of the polling device. The present invention takes advantage of the fact that a polling signal emitted by the antenna of the polling device has a nearly disappearing magnetic field component in the direction of the surface normal and, compared with this, a substantially stronger magnetic field component in parallel to the conductive surface in the vicinity of the electrically conductive surface, extensively independently from the orientation of the transmitting antenna of the polling device. The transponder arrays according to the present invention utilize this property of the field by their orientation with respect to the conductive surface and arrangement on this surface in an especially advantageous manner. In the case of the division of the transponder antenna into a plurality of coil sections, e.g., for transmitting and receiving, the orientation applies to all coil sections.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 6 is a view of a preferred embodiment of a transponder with a section of a coil;

FIG. 7 is a top view of a transponder according to FIG. 6 with fastening means;

FIG. 8 is a cross-section through the transponder according to FIG. 7.

FIG. 9 is a view of a transponder array at an object; and

FIG. 10 is a sectional view showing the position of a transponder T fastened to an object O.

DESCRIPTION OF THE PREFERRED EMBODIMENT

Figure 1:
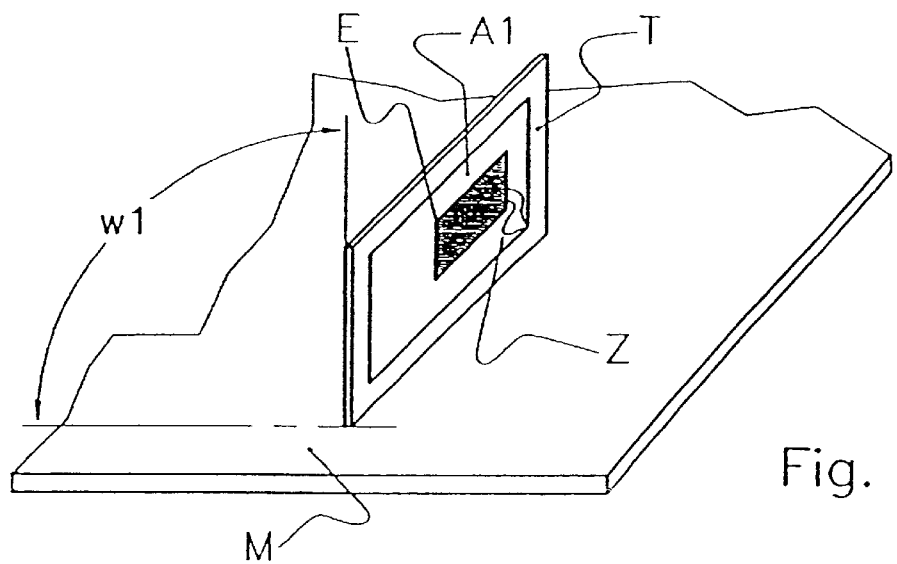
FIG. 1 is view of a transponder arranged on a metallic surface with air core coil.

Referring to the drawings, FIG. 1 shows an oblique view of an array with a transponder on a metallic and electrically conductive surface M. In the example shown, the transponder comprises an antenna A1 designed as a flat air core coil, which is wound, e.g., approximately rectangularly, as well as a transponder electronic unit E, which is electrically connected to the antenna via leads Z. The antenna A1 and the electronic unit E are preferably arranged on a common support body T, which is designed, e.g., as a flat plastic card, or they are embedded in such a support. They are mechanically stabilized and protected, and can be handled in a simple manner as a result. The antenna is fastened to the metallic surface M, i.e., by bonding the support body to this surface, in which the surface spanned by the antenna A1 forms an angle w1 of preferably 90°0 with the metallic surface M. The angle w1 may also have values of <90° to w1>45°, while the function of the array is still satisfactory. The principal direction of the magnetic field of the coil extending at right angles to the antenna surface now forms an angle of <45° with the surface M and preferably extends in parallel thereto. The distance between the metallic surface M and the section of the air core coil A1 located closest to the surface is small, preferably <20 mm. Such a distance may be obtained, e.g., by means of a coating of the metallic surface, an edge area of the support body T located outside the coil surface, or the means for fastening the coil or the support body on the surface, etc. The air core coil of the antenna A1 has, preferably on the side facing the metallic surface, an edge adapted to the course of this surface, i.e., especially a straight edge section extending in parallel to the surface for a flat metallic surface. The coil A1, the transponder electronic unit E, and leads Z are physically and electrically spaced from the conductive surface M as shown in FIG. 1.

Figure 2:
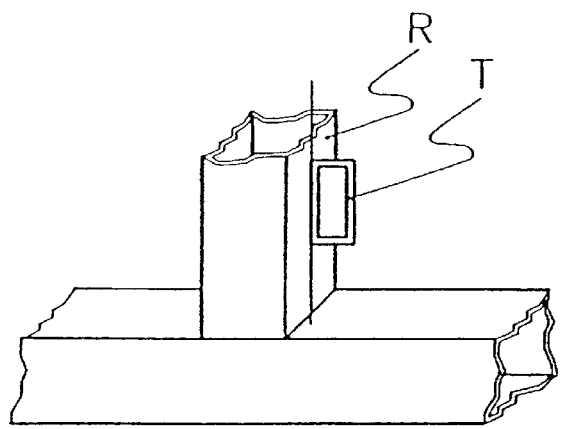
FIG. 2 is a view of a transponder array on a support pipe.

FIG. 2 shows a transponder array with a support body T of the type shown schematically in FIG. 1, in which a transponder is fastened to a flat surface of a metal pipe R such that a straight edge section of the air core coil of the antenna A1 extends essentially along the center line of the pipe surface at a short distance from same and the surface spanned by the air core coil stands essentially vertically on the pipe surface.

Figure 3A:
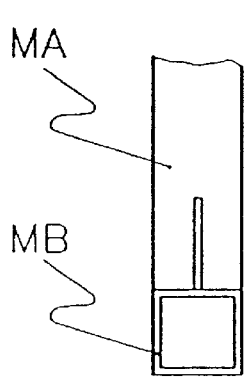
FIGS. 3A and 3B are two views of another transponder array.
Figure 3B:
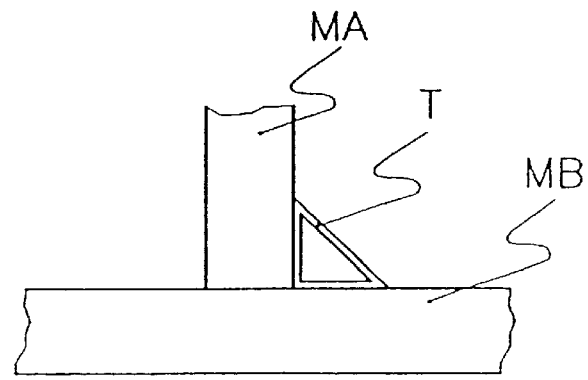

For a metallic construction as in FIG. 2 with an angle formed by two metal surfaces MA and MB, another advantageous transponder array, in which two edge sections of the air core coil extend in parallel to the two metal surfaces forming the angle and simulate the angle, is shown in FIG. 3A with the direction of view in parallel to the plane of the coil and in FIG. 3B with the direction of view at right angles to the plane of the coil. The surface spanned by the air core coil stands essentially vertically on the two metal surfaces MA, MB.

Figure 4:
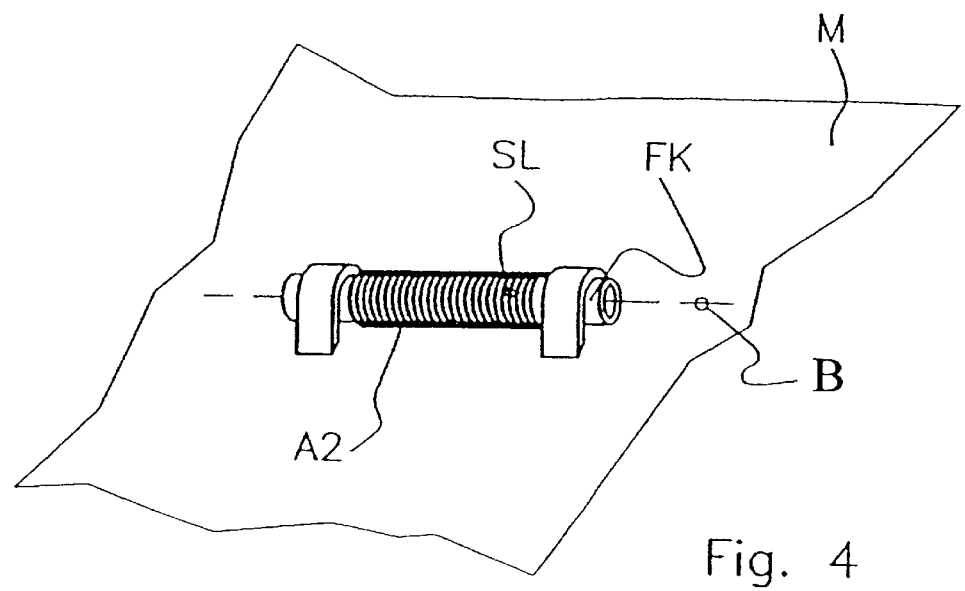
FIG. 4 is a view of a ferrite antenna arranged on a metallic surface.

An array according to the present invention for embodying the transponder antenna as an elongated coil SL, especially as a ferrite coil, i.e., as an elongated coil with a ferrite core FK, is shown schematically in an oblique view in FIG. 4. The ferrite coil A2 is arranged on or at a short distance from the metallic surface M such that the longitudinal axis B (director) of the coil extends in parallel to the metallic surface M. With a still satisfactory function of the array, the longitudinal axis of the coil may also be inclined against the metallic surface and form an acute angle of <45° with same. The ferrite coil is advantageously held by a support body, not shown, which may also be the support of the transponder electronic unit.

Figure 5A:
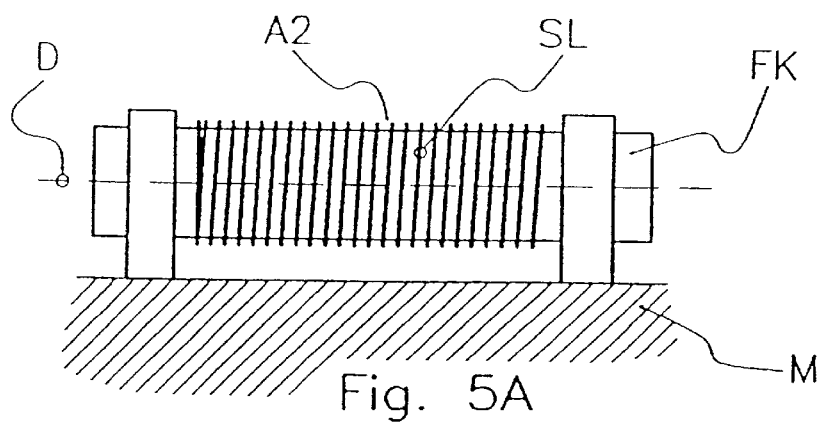
FIGS. 5A and 5B are two views of a transponder array with a ferrite antenna.
Figure 5B:
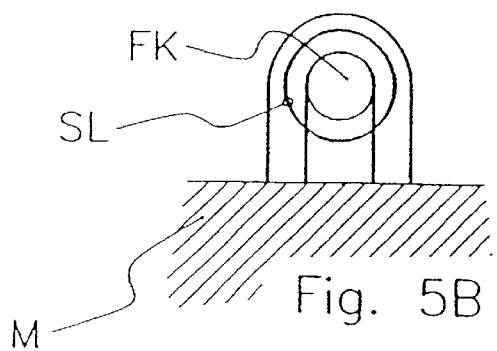

For a transponder array with a ferrite coil according to FIG. 4, FIG. 5A schematically shows a side view with the direction of view at right angles to the coil director B and FIG. 5B shows one with the direction of view in parallel to the coil director B. In the examples shown schematically, the cross section of the coil is approximately round. Analogously to the flat coil design, it is again advantageous in the case of an elongated coil for the circumferential line of the elongated coil to have a section that is parallel to the surface on the side of the elongated coil facing the metallic surface.

The exchange of signals between the transponder and a polling device takes place via an alternating magnetic field, wherein the antennas A1 and A2 are used as the transmitting antenna and the receiving antenna, respectively. The same coil sections, or completely or partially separated coil sections may be used for the case of transmission and reception. Different frequencies are preferably provided for transmission and reception. The power for the operation of the transponder may also be transmitted in the known manner via the alternating field emitted by the transmitting antenna PA of the polling device PD.

The relative orientation of the transponder antenna and of the antenna of the polling device requires at least one position with good field coupling. In polling systems with relative movement between the polling device and the transponder array, this is given in conjunction with the orientation according to the present invention of the transponder antennas and with the field effect of the metallic surface for nearly any relative orientation, so that there is a high degree of freedom for designing the systems.

The explanations given for a flat coil and for an elongated coil also apply analogously to coils and coil sections of a short overall length.

FIGS. 6 through 9 show a preferred embodiment of a transponder for arrangement on a metallic surface.

The transponder shown schematically in FIG. 6 has a flat support body K of an essentially rectangular shape with the length l, the width b and the thickness h. The thickness h of the support body K is advantageously substantially smaller than its length l and width b, i.e. h<<l, b. A coil array SP with a plurality of coil turns are wound on the support body such that the course of the turns is essentially at right angles to the long sides (l) and the longitudinal axis of the coil (director, principal direction of the magnetic field during current flow through the coil array) is essentially parallel to the long sides. Only a section of the coil array is shown. The coil array preferably extends over the entire length of the support body with the exception of areas having fastening means. The coil surface has a small overall height due to the small thickness h of the support body, so that the entire coil surface can be arranged in the especially effective area close to the metallic surface of an object if the transponder is fastened flat on this surface. The coil array may comprise a single coil or a plurality of coil sections, e.g., for different coils or coil combinations in transmission operation and in reception operation. The height h of the support body is preferably in the range of 1 to 5 mm, the width b is preferably in the range of 75 to 80 mm, and the length l is in the range of 5–80 mm.

The support body preferably consists of a nonconductive material, especially plastic and/or ferrite. The material of the support body may also contain ferromagnetic material, in which case measures of a known nature are to be taken, if necessary, to suppress eddy currents. The support body is preferably composed of a plurality of layers, which enclose and surround the transponder electronic assembly unit E (FIGS. 2 and 3).

Fastening means are provided at the support body of the transponder for fastening the transponders on an object, e.g., on the surface of a metallic container, as is schematically shown in FIG. 4 or 9. The support body is not covered by the winding of the coil in the area of the fastening means. The coil SP and the transponder electric unit E are physically and electrically spaced from the conductive surface M as shown in FIGS. 7 and 9. The transponder-side fastening means may be designed either in a form corresponding to the object-side means or preferably in an object-independent form. An advantageous example for the first form of the fastening means are openings in the support body K, which are attached and fastened, e.g., riveted to pins or the like already present on the surface of the object to be equipped with the transponder. The openings may be prepared already during the manufacturing process of the support body.

Metal spikes suitable for welding are advantageously integrated within the support body K, e.g., cast in or inserted later, for the object-independent form of the fastening means. The metal spikes make possible a rapid and reliable fastening by welding to the metallic surface of the object and may also penetrate for this purpose a nonmetallic protective coating that may possibly be present on the metallic surface of the object.

The fastening means are preferably arranged on the support body in edge areas of the support body, e.g., in corners of an essentially rectangular support body or in mounting straps joining the coil-carrying middle part of the support body.

FIGS. 7, 8 and 9 show as examples two different types of fastening means. Metal spikes D are inserted, e.g., cast in, in an edge area of the support body not wound with the coil SP in the left-hand halves of FIGS. 7 and 9, and the tips of these spikes, which project from the support body, are welded to a metallic surface M of an object by, e.g., stud welding. The design of the fastening means as a mounting strap L with an opening P, which is pushed over a pin ST prepared on the object, is shown in the right-hand half of the figure. The transponder is fixed on the object by flattening, bending over, etc. of the pin ST. A transponder electronic assembly unit embedded in the support body is designated by E. The windings of the coil are shown only partially in FIG. 9 for clarity's sake. Contact elements for connecting the coil array to the electronic assembly unit E are not shown, either.

A plurality of fastening elements on one transponder may be of the same type or may belong to different types.

The transponder according to the present invention makes it possible to design mechanically insensitive transponder arrays. Welding to the support body via metallic elements and/or the continuation of the support body in the form of mounting straps make possible an especially simple fastening to the object.

The surface of the transponder, which faces away from the object in the mounted state, is preferably designed as a printable surface, e.g., by means of an additional layer applied over the windings of the coil, which also acts as a protective layer at the same time. The transponder may also be inserted into an open or closed housing for fastening and/or for protection. If the coil is designed as an air core coil, it may be inserted into a support housing having a mounting sleeve.

While specific embodiments of the invention have been shown and described in detail to illustrate the application of the principles of the invention, it will be understood that the invention may be embodied otherwise without departing from such principles.

What is claimed is:

1. A transponder array comprising:
    an electrically conductive surface;
    a transponder antenna arranged on said electrically conductive surface with an antenna coil generating a magnetic field, a principal direction of said magnetic field forming an angle of less than 45° with said conductive surface, said transponder antenna being electrically insulated from said electrically conductive surface;
    a transponder electronic assembly unit electrically connected to said transponder antenna to form a circuit electrically insulated from said electrically conductive surface, said transponder antenna and said transponder electronic assembly are designed to be powered via an alternating field emitted by a transmitting antenna of a polling device.

2. A transponder array in accordance with claim 1, wherein: said magnetic field forms an angle less than 15 degrees with said conductive surface.

3. A transponder array in accordance with claim 1, wherein:
    said coil is a flat air core coil, with a coil surface arranged at right angles to said conductive surface.

4. A transponder array in accordance with claim 3, wherein:
    said coil has a substantially straight edge section and said section extends along said conductive surface.

5. A transponder array in accordance with claim 1, wherein:
    said coil is formed from elongated coils and a longitudinal axes of said elongated coils are oriented substantially parallel to said conductive surface.

6. A transponder array in accordance with claim 1, wherein:
    said coil includes a ferrite core.

7. A transponder array in accordance with claim 1, further comprising:
    a housing connected to said antenna and formed of nonconductive material.

8. A transponder array in accordance with claim 1, wherein:
    said coil includes transmitting and receiving coils.

9. A transponder array in accordance with claim 1, further comprising:
    a support body formed as a flat body with a small height compared with transverse dimensions of said flat body, said antenna coil being wound on said support body with a plurality of coil turns, said coil turns covering a portion of a surface of said support body and being wound around said support body to form a longitudinal axis of said coil oriented substantially in parallel to a plane of said flat body.

10. Transponder in accordance with claim 9, wherein:
    said support body includes fastening means on another portion of said surface, said another surface being not covered by said antenna coil.

11. Transponder in accordance with claim 9, wherein:
    said support body includes a middle part formed substantially rectangular in transverse dimensions, said support body includes fastening means for fastening said support body to an object surface, said fastening means including mounting straps extending from said middle part.

12. Transponder in accordance with claim 11, wherein:
    said fastening means includes an opening through said support body.

13. Transponder in accordance with claim 9, wherein:
    said antenna coil includes a plurality of coil sections having a substantially same orientation.

14. A transponder array in accordance with claim 1, further comprising:

a support body having a planar shape with a length, width and height, said height being less than said length and width, said antenna coil being wound on said support body with a longitudinal axis of said antenna coil being substantially parallel to said planar shape of said support body.

15. A transponder array comprising:

an electrically conductive surface;

a transponder antenna arranged on said electrically conductive surface with an antenna coil having a magnetic field, a principal direction of said magnetic field forming an angle of less than 45° with said conductive surface, said transponder antenna being physically and electrically spaced from said electrically conductive surface;

a transponder electronic assembly unit electrically connected to said transponder antenna to form a circuit electrically insulated from said electrically conductive surface.

16. The transponder array in accordance with claim 15, further comprising:

a support body mounted on said electrically conductive surface, said transponder antenna and said transponder electronic assembly being mounted on said support body.

17. The transponder array in accordance with claim 16, wherein:

said transponder electronic assembly is mounted in said support body.

18. The transponder array in accordance with claim 17, wherein:

said transponder antenna is wound around said support body;

said transponder antenna and said transponder electronic assembly are designed to be powered via an alternating field emitted by a transmitting antenna of a polling device.

19. The transponder array in accordance with claim 16, wherein:

said transponder antenna and said transponder electronic assembly are designed to be powered via an alternating field emitted by a transmitting antenna of a polling device.

\* \* \* \* \*